(12) United States Patent  
van der Pol et al.

(10) Patent No.: US 6,301,974 B1
(45) Date of Patent: Oct. 16, 2001

(54) MASS FLOWMETER (75) Inventors: Roland van der Pol, Venlo (NL); Yousif A. Hussain, Weston Fevell (GB)

(73) Assignee: Krohne A.G. (CH)

( * ) Notice: Subject to any disclaimer, the term of this patent is extended or adjusted under 35 U.S.C. 154(b) by 0 days.

(21) Appl. No.: 09/655,126

(22) Filed: Sep. 5, 2000

Related U.S. Application Data (62) Division of application No. 09/167,099, filed on Oct. 5, 1998, now Pat. No. 6,170,339.

(30) Foreign Application Priority Data

| | | |
|---|---|---|
| Oct. 7, 1997 | (DE) | 197 44 303 |
| Jan. 7, 1998 | (DE) | 198 00 225 |
| Apr. 20, 1998 | (DE) | 198 17 453 |
| Jun. 10, 1998 | (DE) | 198 25 775 |

(51) Int. Cl.$^7$ ........................ G01F 1/84
(52) U.S. Cl. ........................ 73/861.357
(58) Field of Search ............ 73/861.355, 861.356, 73/861.357

(56) References Cited

U.S. PATENT DOCUMENTS 4,217,774 * 8/1980 Agar ................................ 73/32 A
5,157,975 * 10/1992 Tanaka et al. ................ 73/861.355

* cited by examiner

*Primary Examiner*—Harshad Patel
(74) *Attorney, Agent, or Firm*—Cesari and McKenna (57) ABSTRACT A mass flowmeter is described and depicted that operates according to the Coriolis principle, with a straight Coriolis tube that conducts the flowing medium, with an oscillation driver, assigned to the Coriolis tube and which excites the Coriolis tube, with two detectors assigned to the Coriolis tube and which register Coriolis forces, or Coriolis oscillations caused by Coriolis forces, and with shell that encloses the Coriolis tube. The mass flowmeter has a notably smaller total length relative to the nominal length of the Coriolis tube than mass flowmeters made according to the prior art because the Coriolis tube is flexibly mounted to an inlet and outlet in the shell.

1 Claim, 7 Drawing Sheets

MASS FLOWMETER

RELATED APPLICATION

This application is a division of Ser. No. 09/167,099 filed Oct. 5, 1998, now U.S. Pat. No. 6,170,339.

The invention concerns a mass flowmeter that operates according to the Coriolis principle, with an essentially straight Coriolis tube that conducts a flowing medium, with at least one oscillation driver, assigned to the Coriolis tube and which excites the Coriolis tube, with at least one detector, assigned to the Coriolis tube and which registers Coriolis forces or Coriolis oscillations caused by Coriolis forces, and with a cylindrical shell that encloses the Coriolis tube.

BACKGROUND OF THE INVENTION

It is specified at the outset that the mass flowmeter under discussion comprises, among other items, at least one oscillation driver "assigned" to the Coriolis tube and at least one detector "assigned" to the Coriolis tube. As a rule, the oscillation driver or oscillation drivers (or in any case a part of the oscillation driver or oscillation drivers), and the detector or detectors (or in any case a part of the detector or detectors), are connected to the Coriolis tube. Since this is not necessary, however, the expression "assigned" is used instead of the expression "connected".

In the case of mass flowmeters that operate according to the Coriolis principle, one makes a basic distinction between those in which, on the one hand, the Coriolis tube is at least essentially straight and those in which, on the other hand, the Coriolis tube is loop-shaped. In addition, one distinguishes in the case of mass flowmeters like the one under discussion between those that have, on the one hand, only one Coriolis tube and those that have, on the other hand, two Coriolis tubes. In the constructions with two Coriolis tubes, they can lie in series or in parallel with each other, in a hydrodynamic sense.

In recent times, mass flowmeters with only one essentially straight Coriolis tube have found increasing acceptance. Mass flowmeters with straight Coriolis tubes are mechanically simple to construct and therefore relatively inexpensive to produce. The inner surfaces of their Coriolis tubes are easy to work on (e.g., to polish), they show a small pressure drop, and they are self-emptying.

Despite all their advantages, mass flowmeters with only one straight Coriolis tube are problematic from a number of aspects.

First, because of the thermally-caused expansions and/or stresses associated with a straight Coriolis tube, the accuracy of its measurements depends on the temperature of the flowing medium. In the extreme case, the thermally-caused stresses can even lead to mechanical damage, specifically to stress cracks in the Coriolis tube. This problem is discussed for example in DE 41 24 295 A1 and DE 196 01 342 A1.

Furthermore, the coupling of external perturbations into a mass flowmeter with only one Coriolis tube is stronger than in the case of mass flowmeters in which two parallel Coriolis tubes are operated in the manner of a tuning fork, because in the case of mass flowmeters with only one Coriolis tube, the center of gravity of the mass flowmeter is not fixed. DE 44 23 168 A1 and DE 196 932 500 A1 deal with minimization of the coupling in of external perturbations, i.e., vibrations in the surrounding tubing system.

Finally, DE 197 32 605 A1 deals with the difficulty that arises in measuring the extremely small phase differences between the two signals delivered by the detectors, which are proportional to the mass flow, in the case of a mass flowmeter with a straight Coriolis tube. The usual industrial requirements for accuracy of the mass flowmeter demand a resolution of phase differences of the order of $1 \times 10^{-5}$ degrees.

Over and above the problems mentioned above, for which solutions have been approached already in the quoted publications, there is a further problem in mass flowmeters with a straight Coriolis tube, in that the total length of the mass flowmeter is always large in comparison with the nominal length of the Coriolis tube. The large length of the mass flowmeter, relative to the nominal length of the Coriolis tube, results from the necessity, at a given Coriolis tube diameter, to provide a free length of the Coriolis tube over which the Coriolis tube can oscillate with the necessary amplitude. If the Coriolis tube is too stiff, oscillation of the Coriolis tube can not take place with sufficient amplitude to guarantee a reasonable measurement accuracy. The resulting large total length of a mass flowmeter with a straight Coriolis tube is obviously not desirable, since the space available for installation in, for example, the chemical industry and the food preparation industry, where these mass flowmeters are often used, is limited.

SUMMARY OF THE INVENTION

The object of the invention is, therefore, to make available a mass flowmeter with a straight Coriolis tube that has a smaller total length, relative to the nominal length of the Coriolis tube, than the previously used mass flowmeters of the type under discussion. Furthermore, it is to be ensured that thermally-caused expansions and/or stresses in the Coriolis tube do not lead to mechanical damage of the mass flowmeter.

The object as derived and demonstrated to this point is solved according to the invention, first of all, by mounting the Coriolis tube flexibly to an inlet and an outlet of a shell, preferably a cylindrical shell. For this purpose the inlet and outlet are formed preferably either as conically tapered diaphragms, or formed in such a way (with an arched shape, for example) that both the inlet and outlet can expand slightly without causing large stresses in the inlet or outlet or in the Coriolis tube.

Because the Coriolis tube of a mass flowmeter operating by the Coriolis principle is, in accordance with the invention, mounted flexibly or floating, it is not necessary to deform the Coriolis tube, as in mass flowmeters of the prior art. Also, a flexibly mounted Coriolis tube of "almost unlimited" stiffness can be excited in such a way that Coriolis forces are generated in combination with a medium flowing through the Coriolis tube. Since a deformation of the Coriolis tube is not necessary, the Coriolis tube can be made with a shorter length, relative to its nominal length, and therefore the total length of the mass flowmeter constructed according to the invention can also be relatively small. This is true especially if the inlet and outlet that serve as flexible mounts for the Coriolis tube are short in length. With optimal dimensioning of the Coriolis tube, the cylindrical shell, and the components that serve as flexible mounts for the Coriolis tube, a mass flowmeter can be realized, for example, that has a total length of only 20 cm or at most 30 cm for a maximum flow of 300 kg/min.

It is also advantageous, in mass flowmeters designed according to the invention, that the frequency of oscillation of the Coriolis tube is practically independent of temperature, since the flexibly mounted Coriolis tube is not subjected to either bending or torsion.

An especially preferred embodiment of a mass flowmeter according to the invention is one in which the cylindrical shell forms the meter housing of the mass flowmeter, and the cylindrical shell is preferably made as a relatively heavy metal block, hollowed out to accept the Coriolis tube, oscillation driver and detector. This embodiment of a mass flowmeter according to the invention can be clamped in directly between the flanges of adjoining tubing, and a non-alignment of the Coriolis tube with the adjoining tubing—naturally within limits—does not lead to problems.

A mass flowmeter made according to the invention can also have, however, in addition to the cylindrical shell, a special meter housing fitted with flanges on both ends as needed, as is actually usual in current engineering practice. In this embodiment, there are two connecting tubes between the Coriolis tube and the meter housing. The connecting tubes are attached preferably to the inlet and outlet, somewhere near the middle of the tapered region. It is helpful in achieving the desired "limitless" movability of the Coriolis tube if the above-mentioned connecting tubes have the form of diaphragms.

In mass flowmeters made according to the invention it must naturally also be taken into account, while implementing the measures that lead to the required oscillations of the Coriolis tube, that the Coriolis tube is mounted flexibly in the cylindrical shell. Not all of the known technical methods for creating oscillations in the Coriolis tube are applicable to a mass flowmeter made according to the invention.

Concerning the necessary methods of putting the Coriolis tube into oscillation, a first embodiment of the mass flowmeter according to the invention has the characteristic that the oscillation driver excites the Coriolis tube to oscillation around an oscillation axis running perpendicular to the longitudinal axis of the Coriolis tube. Thereby, the oscillation axis lies in the median plane of the mass flowmeter, running perpendicular to the longitudinal axis of the Coriolis tube. It may be said in complete generality that in mass flowmeters made according to the invention, the Coriolis tube oscillates symmetrically about the center plane running perpendicular to the longitudinal axis of the Coriolis tube, but always phase-shifted by 180°.

In a mass flowmeter made according to the invention, the oscillation driver can act between the cylindrical shell and a pendulum installed on the Coriolis tube, essentially at the middle of its long dimension and perpendicular to the longitudinal axis of the Coriolis tube, or it can act between the cylindrical shell and a torsion rod installed on the Coriolis tube, essentially at the middle of its long dimension and perpendicular to the longitudinal axis of the Coriolis tube. If the pendulum or torsion rod is provided with a compensation mass, then inertial forces of the Coriolis tube can be compensated to a large extent.

Instead of the above described measures, a mass flowmeter in accordance with the invention can also have two oscillation drivers arranged left and right of the middle of the long dimension of the Coriolis tube. The two oscillation drivers must act in opposite phase on the Coriolis tube. Especially in this embodiment, piezo-electric elements supported by springs can be used as oscillation drivers.

In a mass flowmeter made according to the invention it is possible to implement the measures necessary to set the Coriolis tube into oscillation in such a way that the oscillation driver excites the ends of the Coriolis tube into wavering motion around the longitudinal axis of the Coriolis tube, and the wavering motions of one end of the Coriolis tube are 180° out of phase with the wavering motions of the other end of the Coriolis tube. Even for this kind of oscillation of the Coriolis tube, it is true that, as for the previously described kinds of oscillation of the Coriolis tube, there is no movement of the middle point of the Coriolis tube lying in the center plane of the mass flowmeter and/or the Coriolis tube. All oscillations consequently take place around this middle point.

The above-described way of imparting to the Coriolis tube the oscillation that is always necessary for its operation can be realized, for example, in the following way: the oscillation driver consists of several driver elements, each generating transverse motions and displaced by 90° with respect to each other, and the individual driver elements are excited sinusoidally with 90° phase shifts. This method generates rotary motions by the superposition of transverse motions.

In order to keep thermally-caused expansions and/or stresses as small as possible, for example those caused by temperature changes in the flowing medium, it is further proposed, in accordance with another teaching of the invention, that at least the Coriolis tube consists of a material with a relatively small thermal expansion. Materials such as Duplex, stainless steel, nickel, titanium, or materials strengthened with carbon fibers or glass fibers can be used.

Furthermore, according to another teaching of the invention, the Coriolis tube may alternatively consist of a combination of materials: one material that has, on the one hand, good corrosion properties and another material that has, on the other hand, a small thermal expansion coefficient. The material with good corrosion properties is in direct contact with the flowing medium and is surrounded by the material with a small thermal expansion coefficient. This achieves the high corrosion resistance of the Coriolis tube that is frequently required, and at the same time it reduces the usually relatively large thermal expansion that arises when only materials with good corrosion properties are used.

According to a further teaching of the invention, which can be applied alternatively or cumulatively, at least the Coriolis tube can be arranged to operate under a pre-stress of tension or pressure in the cylindrical shell. A tension pre-stress is necessary if a mass flowmeter made according to the invention is to be suited for especially high temperatures, while a pressure pre-stress is necessary if a mass flowmeter made according to the invention is to be useable at especially low temperatures. If the Coriolis tube is installed in the cylindrical shell under tension pre-stress, then with increasing temperature the tension will be reduced at first, and the pressure stress that occurs after that can be held within permissible limits. If, on the other hand, the Coriolis tube is installed in the cylindrical shell under pressure pre-stress, then with decreasing temperature, the pressure stress will be reduced at first, and the tension stress that occurs after that can be held within permissible limits.

In particular, there is a large number of possibilities for making and modifying a mass flowmeter according to the invention. In addition, reference is made on the one hand to the dependent patent claims, and on the other hand to the description of various embodiment examples of the mass flowmeter in accordance with the invention which accompany the drawings.

DETAILED DESCRIPTION OF ILLUSTRATIVE EMBODIMENTS

Figure 10:
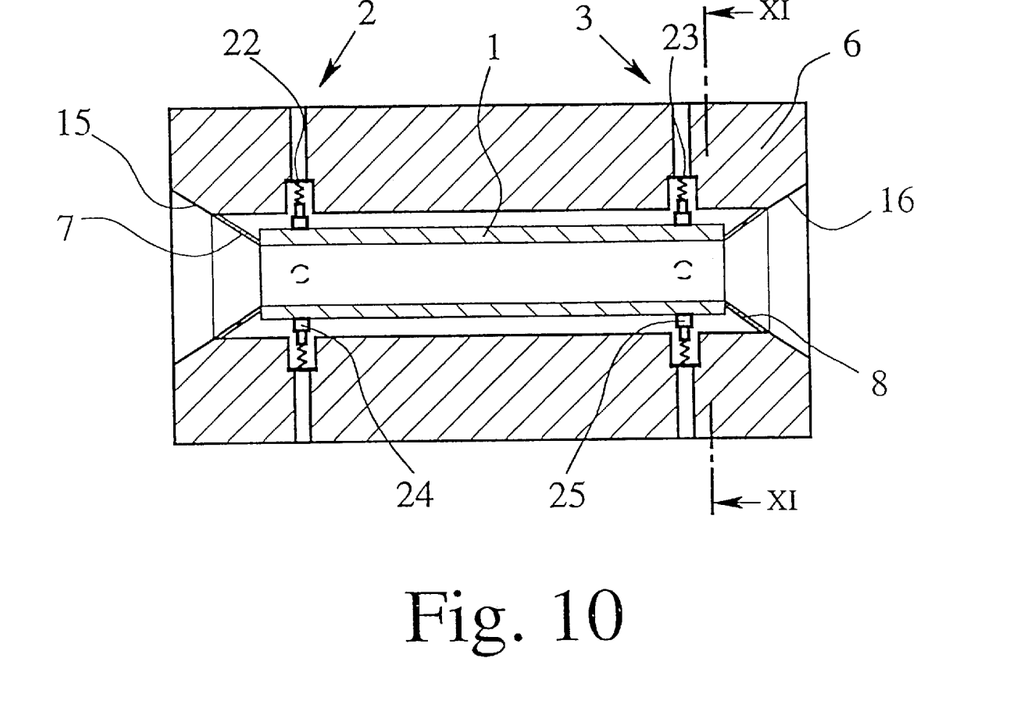
FIG. 10 is a view similar to FIG. 1 of a fifth example of an embodiment of the mass flowmeter in accordance with the invention.
Figure 11:
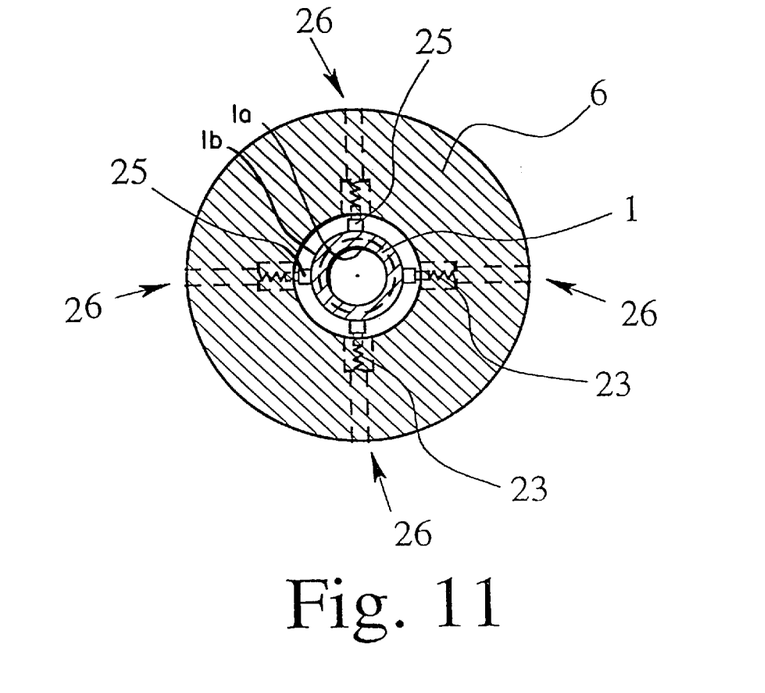
FIG. 11 is a section through the mass flowmeter shown in FIG. 10 along the line XI—XI.
Figure 12:
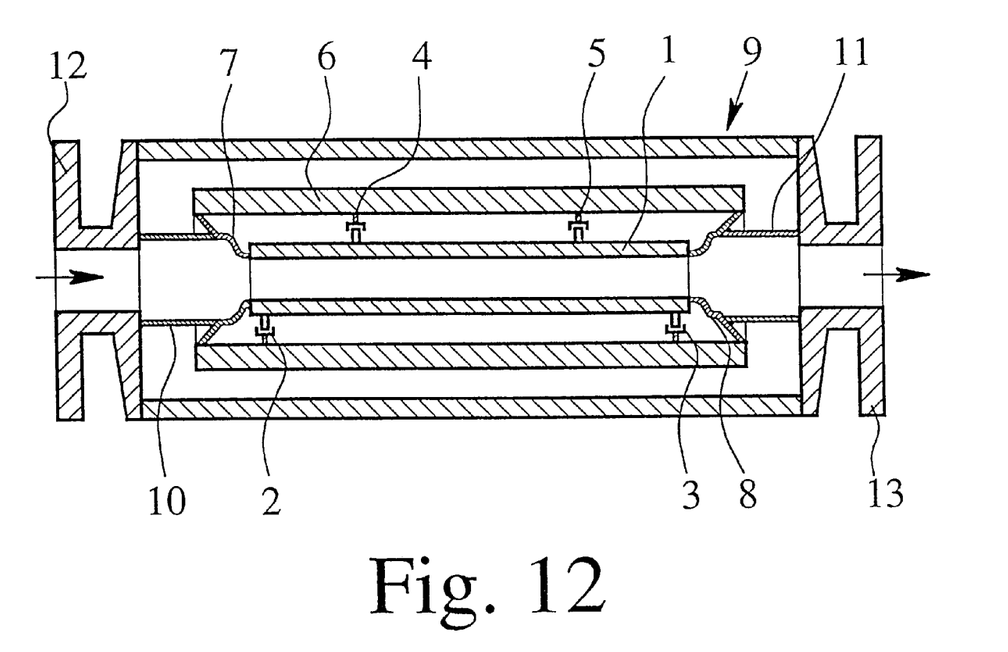
FIG. 12 is a view similar to FIG. 1 of a sixth example of an embodiment of the mass flowmeter in accordance with the invention, similar to the fourth embodiment example.

The mass flowmeters represented by FIGS. 1 to 4 and by FIGS. 10 to 12 operate, as is known, according to the Coriolis principle and in their basic construction consist of a straight Coriolis tube 1 that conducts the flowing medium, an oscillation driver 2 (FIGS. 1 and 2) that excites the Coriolis tube 1 and is assigned to Coriolis tube 1, or two oscillation drivers 2, 3 (FIGS. 3 and 4, and 10 to 12) that excite the Coriolis tube 1 and are assigned to Coriolis tube 1, two detectors 4, 5 that register Coriolis forces, or Coriolis oscillations based on Coriolis forces, and are assigned to Coriolis tube 1, and a cylindrical shell 6 which encloses the Coriolis tube 1.

According to the invention, the Coriolis tube 1 is mounted flexibly in a cylindrical shell 6 by a conically tapered inlet 7 and a similar conically tapered outlet 8, as shown in detail by FIGS. 1 to 4, and 10. With this flexible mounting, it is not necessary to deform the Coriolis tube 1, as is done in mass flowmeters made according to prior art. Even an "almost limitlessly" stiff Coriolis tube 1, flexibly mounted, can be excited in such a way that, in combination with a flowing medium in the Coriolis tube 1, Coriolis forces are generated.

FIGS. 1 to 3, 10 and 11 show an especially preferred embodiment of the mass flowmeter according to the invention, which is characterized by a cylindrical shell 6 that also forms the meter housing of the mass flowmeter, and is made of a relatively heavy metal block hollowed out to accept the Coriolis tube 1, oscillation driver 2 or drivers 2, 3, and detectors 4, 5. This embodiment of the mass flowmeter according to the invention can be clamped in directly between the flanges of adjacent tubing (not shown), and a non-alignment of the Coriolis tube 1 with the adjacent tubing is—naturally within limits—not a problem.

Figure 2:
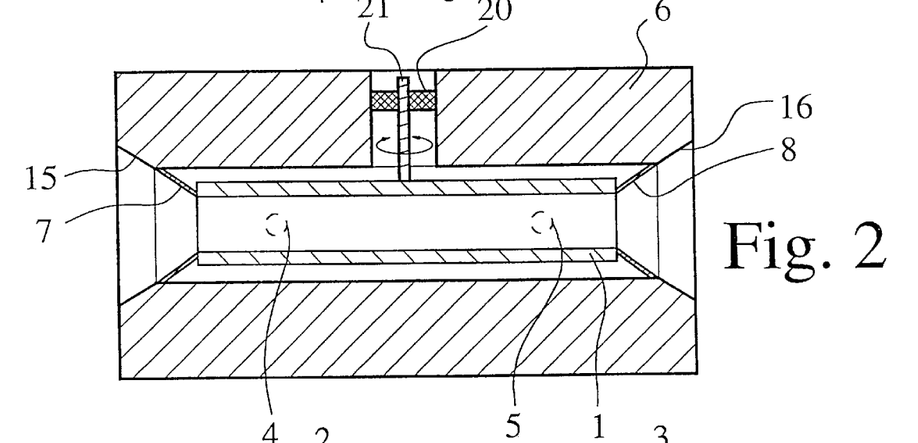
FIG. 2 is a similar view of a second example of an embodiment of the mass flowmeter in accordance with the invention.
Figure 3:
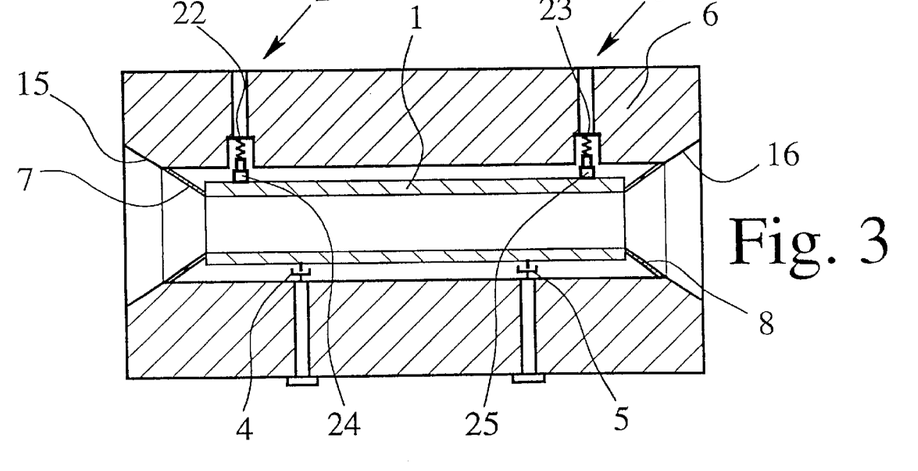
FIG. 3 is a similar view of a third example of an embodiment of the mass flowmeter in accordance with the invention.
Figure 4A:
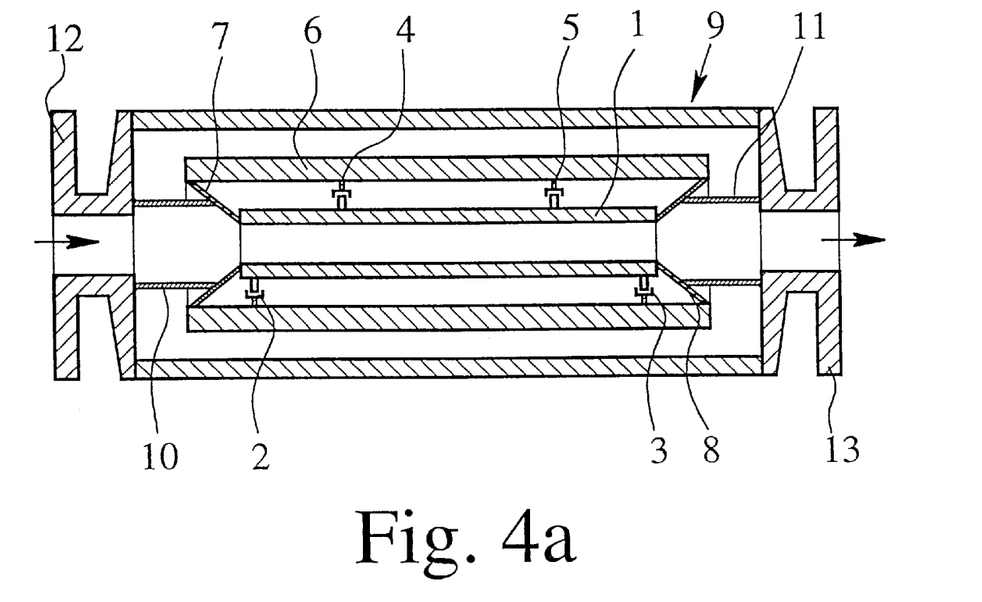
FIGS. 4a to 4c are similar views of a fourth example of an embodiment of the mass flowmeter in accordance with the invention, in different operational states.
Figure 4B:
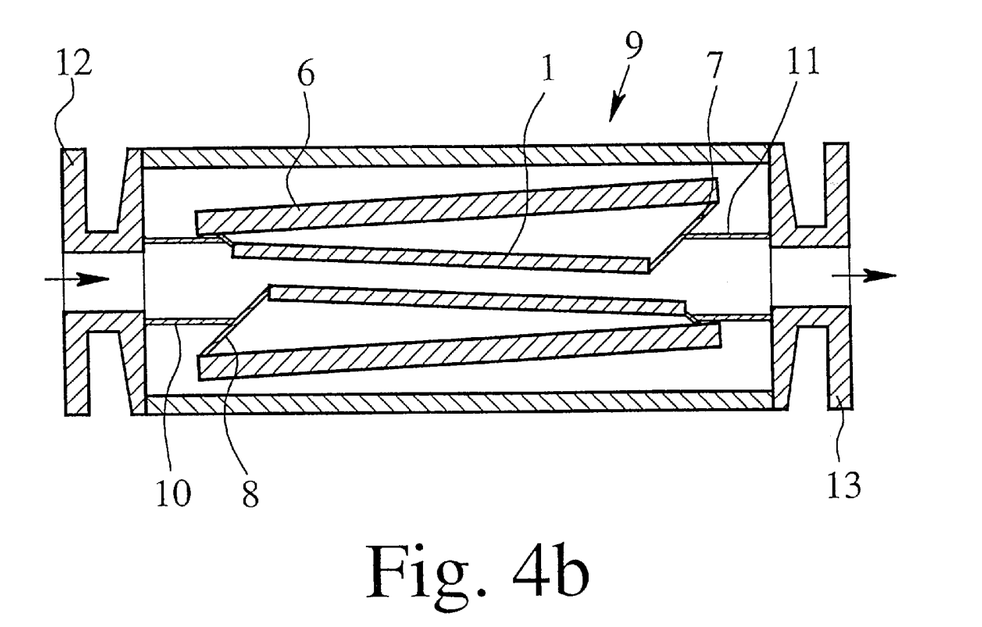
Figure 4C:
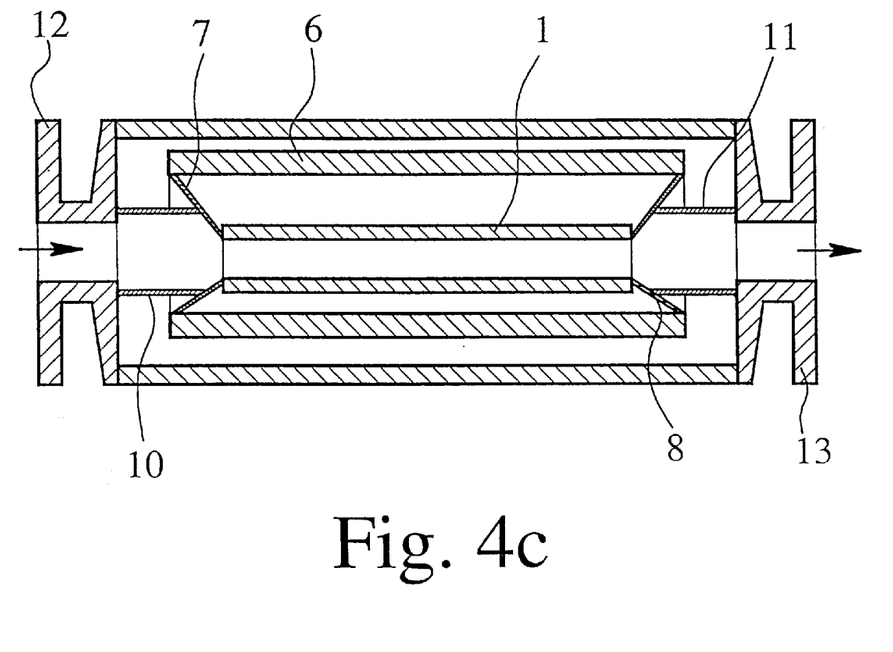

In contrast to what is shown in FIGS. 1 to 3, 10 and 11, FIGS. 4 and 12 show an embodiment of the mass flowmeter according to the invention that is characterized by the presence of a meter housing 9 in addition to the cylindrical shell 6, and two connecting tubes 10, 11 are provided between the Coriolis tube 1 and the meter housing 9. As shown by FIG. 4, the connecting tubes 10, 11 are connected to the conically tapered inlet 7 and the likewise conically tapered outlet 8, approximately in the middle of the tapered region. Furthermore, the connecting tubes 10, 11, as well as the inlet 7 and outlet 8, are formed as diaphragms, and the meter housing 9 is provided with flanges 12, 13.

As distinguished from FIG. 4, FIG. 12 shows an embodiment of the mass flowmeter according to the invention that is characterized by the fact that the inlet 7 and outlet 8 are implemented with an arched shape. With this implementation, the inlet 7 and outlet 8 can each expand slightly without causing large stresses in the inlet 7 or outlet 8, so that also no large stresses will be transferred to the Coriolis tube 1. Likewise, the Coriolis tube 1 can itself expand slightly without causing large stresses in it, since the inlet 7 and outlet 8 also permit such an expansion, if obviously only to a small degree.

FIG. 4a shows the mass flowmeter made according to the invention in a static state, i.e., when no oscillations are present. In contrast, FIG. 4b shows the mass flowmeter made in accord with the invention with an excitation oscillation present, and FIG. 4c shows the mass flowmeter made in accordance with the invention with a Coriolis oscillation present. Both in the presence of an excitation oscillation and in the presence of a Coriolis oscillation, the Coriolis tube 1 oscillates in phase opposition with respect to the cylindrical shell 6. This is therefore a balanced system, in which only very little energy and a minor amount of oscillation is transferred to the meter housing 9.

In all of the embodiment examples according to FIGS. 1 to 3 and 10 and 11, conically tapered sections 15, 16 of the cylindrical shell 6 follow the conically tapered inlet and outlet 7, 8. This is not true for the embodiment example according to FIG. 4.

In implementing the measures which lead to the necessary oscillation of the Coriolis tube 1, it is naturally taken into consideration, for the individual embodiment examples of mass flowmeters according to the invention, that the Coriolis tube 1 is flexibly mounted in the cylindrical shell 6.

Figure 1:
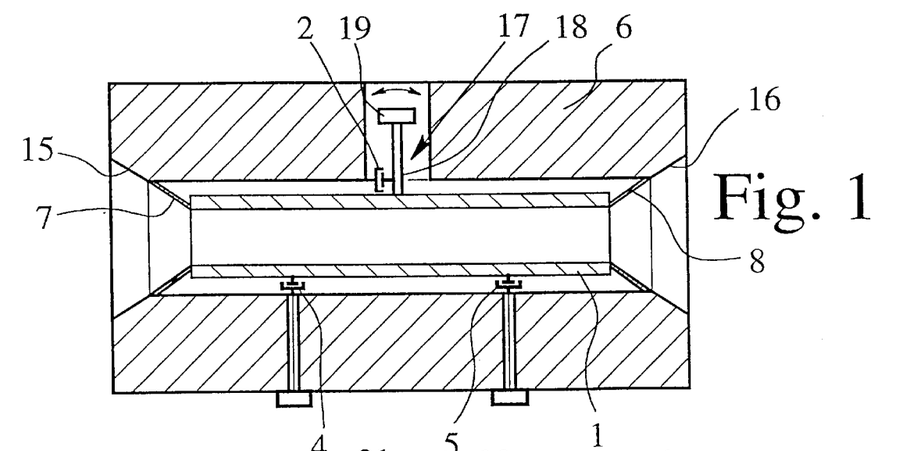
FIG. 1 is a cross sectional view of a first example of an embodiment of the mass flowmeter in accordance with the invention.

For the embodiment examples of mass flowmeters according to the invention represented in FIGS. 1 to 4 and 12, the Coriolis tube 1 is excited to oscillation around an oscillation axis running perpendicular to the longitudinal axis of the Coriolis tube 1 by the oscillation driver 2 (FIGS. 1 and 2) or drivers 2, 3 (FIGS. 3, 4 and 12). The oscillation axis lies in the median plane of the mass flowmeter and/or the Coriolis tube 1, running perpendicular to the longitudinal axis of the Coriolis tube 1. Thus the Coriolis tube 1 oscillates symmetrically with respect to the median plane running perpendicular to the longitudinal axis of the Coriolis tube 1, but always with a phase shift of 180°.

FIG. 1 shows an embodiment example of the mass flowmeter according to the invention in which the oscillation driver 2 acts between the cylindrical shell 6 and a pendulum 17, installed perpendicular to the longitudinal axis of the Coriolis tube 1 and essentially at the middle of the long dimension of the Coriolis tube 1. The pendulum has a pendulum arm 18 and a compensation mass 19 as component parts. The compensation mass 19 is chosen to make the characteristic frequency of the pendulum 17 agree in so far as possible with the characteristic frequency of the excitation oscillation of the Coriolis tube 1.

In the embodiment example of the mass flowmeter according to the invention shown in FIG. 2, the oscillation driver 2 acts between the cylindrical shell 6 and a torsion bar 21, installed perpendicular to the longitudinal axis of the Coriolis tube 1 and essentially at the middle of the long dimension of the Coriolis tube 1, and provided with a compensation mass 20.

In the embodiment example of the mass flowmeter according to the invention shown in FIG. 3, two oscillation drivers 2, 3 are arranged along the length of the Coriolis tube 1, left and right of the middle, and the oscillation drivers 2, 3 are implemented as piezo-electric elements 24, 25, supported on springs 22, 23.

Figure 5:
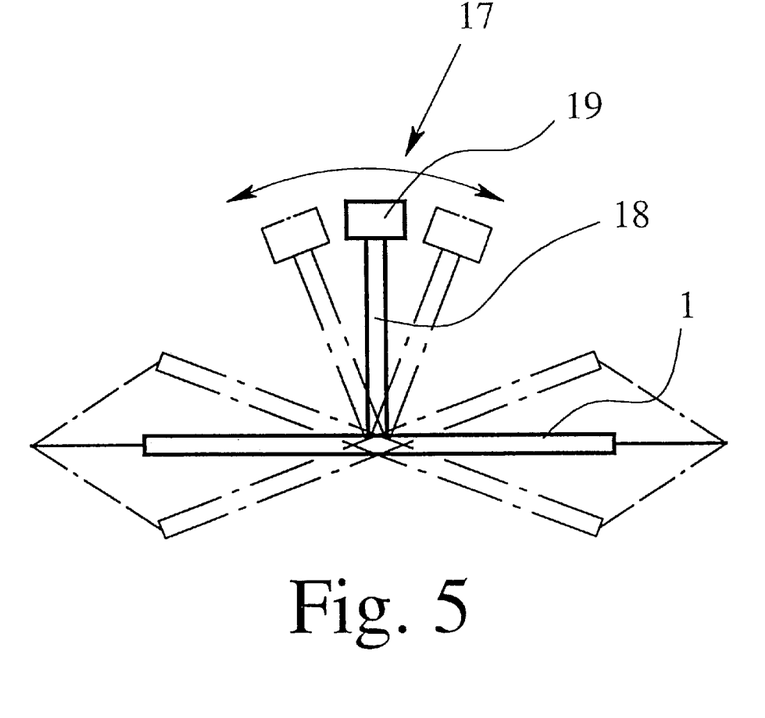
FIG. 5 is a schematic diagram of the excitation oscillation in the case of the first embodiment example of a mass flowmeter in accordance with the invention.

FIG. 5 shows a schematic diagram of the excitation oscillation of the Coriolis tube 1 and pendulum 17 for the first embodiment example of the mass flowmeter according to the invention. It is immediately clear that the Coriolis tube 1 executes oscillations around an oscillation axis running perpendicular to the longitudinal axis of the Coriolis tube 1. In FIG. 5, the oscillation axis runs perpendicular to the plane of the drawing. It can be seen from FIG. 5 that, because of the flexible mount, the Coriolis tube 1 experiences essentially no deformation. Only the diaphragms indicated in FIG. 5 are appreciably deformed.

Figure 6A:
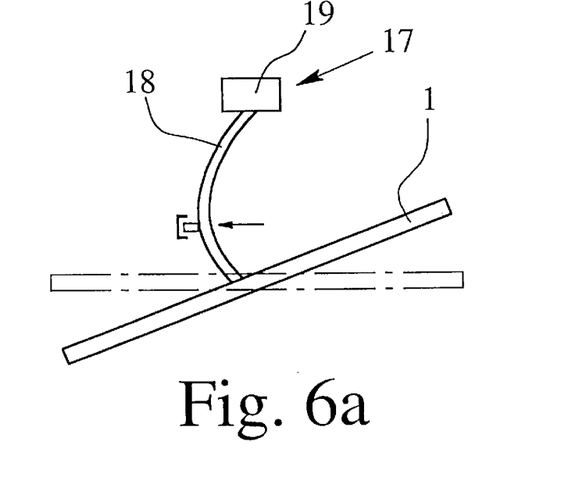
FIGS. 6a to 6b are schematic diagrams of the motion of the pendulum in the case of the first embodiment example of a mass flowmeter in accordance with the invention.
Figure 6B:
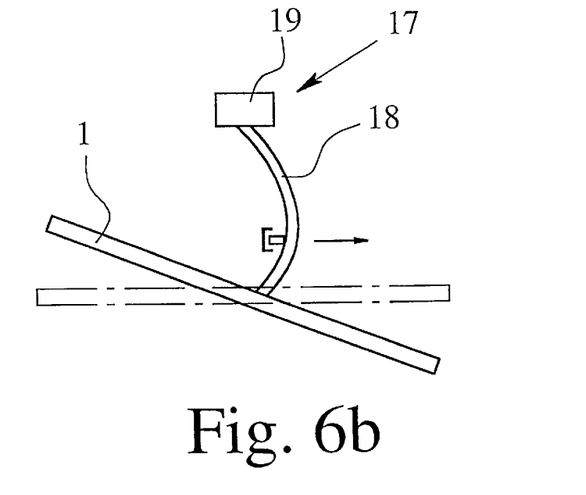

The Coriolis tube 1 and pendulum 17 are represented in FIGS. 6a and 6b in various phases of the excitation oscillation, in order to explain the forces acting on the pendulum 17 and the Coriolis tube 1. In each case the deformations of the pendulum arm 18 are shown greatly exaggerated.

Figure 7:
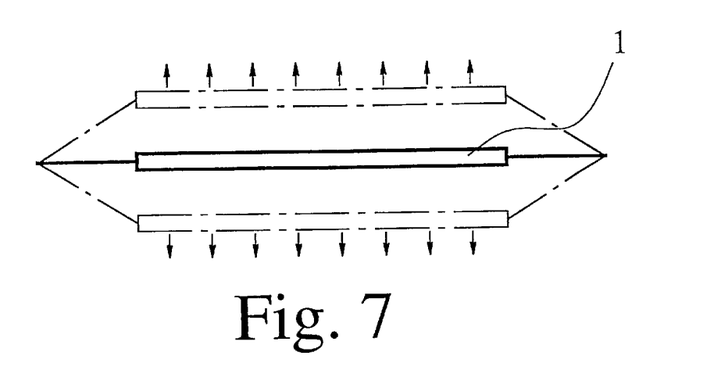
FIG. 7 is a schematic diagram of a Coriolis oscillation excited by Coriolis forces in a Coriolis tube of a mass flowmeter in accordance with the invention.

FIG. 7 shows in principle the Coriolis oscillation that is excited by Coriolis forces arising in the medium flowing through the Coriolis tube 1. The superposition of the Coriolis oscillation on the excitation oscillation represented in FIG. 5, leads to a measurable phase difference of the oscillation of two points right and left of the middle of the Coriolis tube 1. This phase difference is proportional to the mass flow, since the Coriolis forces that cause the phase difference are proportional to the mass flow through the Coriolis tube 1.

Figure 8:
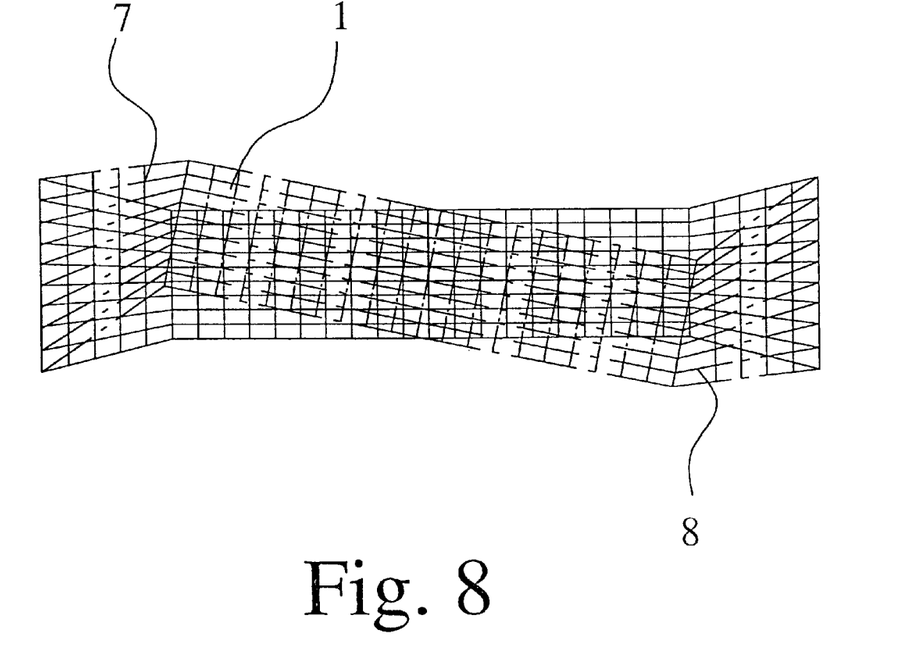
FIG. 8 is a numerical simulation of the deformations during the excitation oscillation of the flowmeter.
Figure 9:
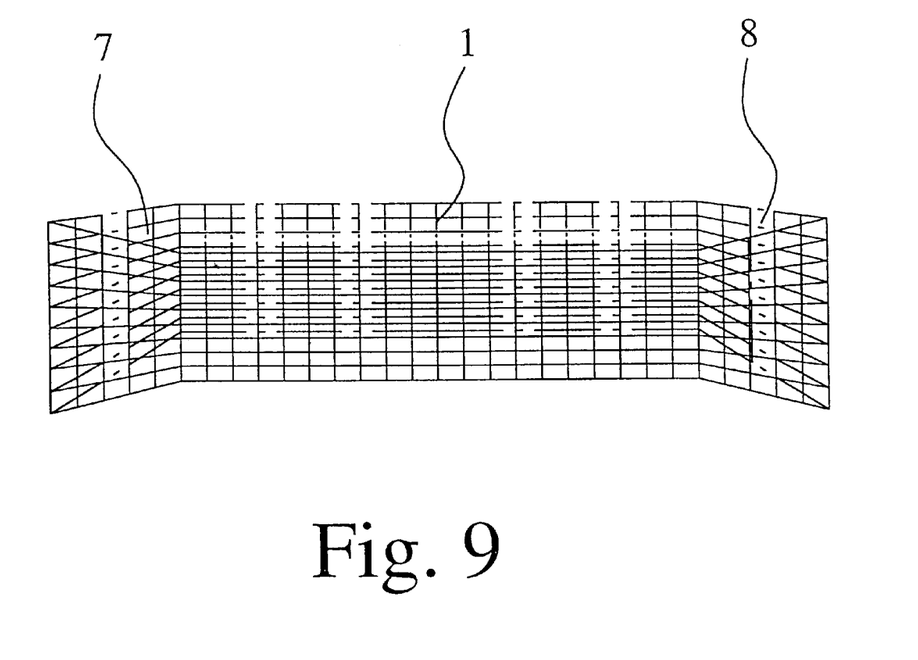
FIG. 9 is a numerical simulation of the deformations during the Coriolis oscillation of the flowmeter.

The deformations of the Coriolis tube 1, the inlet 7 and the outlet 8, caused by the excitation oscillation and by the Coriolis oscillation, as determined by the finite element method, are represented in FIGS. 8 and 9. It is immediately clear that the Coriolis tube 1 experiences hardly any deformation, while the inlet 7 and outlet 8 experience deformations that result from both oscillations.

For the embodiment example of a mass flowmeter according to the invention represented in FIGS. 10 and 11, the oscillation drivers 2, 3 excite the ends of the Coriolis tube 1 to wavering motions around the longitudinal axis of the Coriolis tube 1, in which the wavering motions of one half of the Coriolis tube 1 are phase-shifted by 180° with respect to the wavering motions of the other half of the Coriolis tube 1. In detail, this is implemented by making the oscillation drivers 2 and/or 3 out of driver elements 26 that generate transverse motions and are displaced by 90° with respect to each other, and by exciting the individual driver elements 26 sinusoidally with a phase shift of 90°. This generates rotary motion by a superposition of transverse motions.

We claim:

1. A mass flowmeter that operates according to the Coriolis principle comprising an essentially straight Coriolis tube (1) for conducting a flowing medium, said Coriolis tube having first and second ends, a shell (6) that encloses the Coriolis tube (1), a flexible inlet connecting the first end of the Coriolis tube (1) to the shell (6) and a flexible outlet connecting the second end of Coriolis tube (1) to shell (6), said Coriolis tube (1) comprising a material with good corrosion properties and a material with a small coefficient of thermal expansion, the material with good corrosion properties standing in direct contact with the flowing medium and being surrounded by the material with small coefficient of thermal expansion.

* * * * *